(12) United States Patent
Anbalagan et al.

(10) Patent No.: US 9,171,161 B2
(45) Date of Patent: Oct. 27, 2015

(54) TRUSTED DEVICE HAVING VIRTUALIZED REGISTERS

(75) Inventors: Arun P. Anbalagan, Tamil Nadu (IN); Pruthvi P. Nataraj, Karnataka (IN); Bipin Tomar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1773 days.

(21) Appl. No.: 11/558,024

(22) Filed: Nov. 9, 2006

(65) Prior Publication Data

US 2008/0114989 A1    May 15, 2008

(51) Int. Cl.
H04L 27/01    (2006.01)
G06F 21/57    (2013.01)

(52) U.S. Cl.
CPC ...................................... *G06F 21/57* (2013.01)

(58) Field of Classification Search
USPC ......... 713/155, 100, 166, 167, 189, 190, 193; 726/22, 27; 380/281
See application file for complete search history.

(56) References Cited

U.S. PATENT DOCUMENTS

| | | | | |
|---|---|---|---|---|
| 5,619,711 | A * | 4/1997 | Anderson | 712/221 |
| 5,825,878 | A * | 10/1998 | Takahashi et al. | 713/190 |
| 6,233,599 | B1 * | 5/2001 | Nation et al. | 718/102 |
| 6,735,310 | B1 | 5/2004 | Hsing et al. | |
| 6,772,288 | B1 | 8/2004 | Flake et al. | |
| 6,798,884 | B1 | 9/2004 | Kasahara et al. | |
| 7,099,477 | B2 | 8/2006 | Bade et al. | |
| 7,587,595 | B2 * | 9/2009 | Scarlata et al. | 713/167 |
| 2002/0194496 | A1 | 12/2002 | Griffin et al. | |
| 2003/0046563 | A1 * | 3/2003 | Ma et al. | 713/190 |
| 2003/0074548 | A1 | 4/2003 | Cromer et al. | |
| 2004/0055003 | A1 * | 3/2004 | Sundaram et al. | 718/108 |
| 2004/0064457 | A1 | 4/2004 | Zimmer et al. | |
| 2004/0242197 | A1 * | 12/2004 | Fontaine | 455/411 |
| 2005/0038973 | A1 * | 2/2005 | Ito et al. | 711/207 |
| 2005/0086509 | A1 * | 4/2005 | Ranganathan | 713/200 |
| 2005/0120200 | A1 * | 6/2005 | Brignone et al. | 713/154 |
| 2005/0210467 | A1 * | 9/2005 | Zimmer et al. | 718/1 |

(Continued)

FOREIGN PATENT DOCUMENTS

| | | |
|---|---|---|
| TW | 378473 | 1/2000 |
| TW | 546936 | 8/2003 |

(Continued)

*Primary Examiner* — Joseph P Hirl
*Assistant Examiner* — Sayed Beheshti Shirazi
(74) *Attorney, Agent, or Firm* — Mitch Harris, Atty at Law, LLC; Andrew M. Harris; Parashos T. Kalaitzis

(57) ABSTRACT

A trusted device having virtualized registers provides an extensible amount of storage for hash values and other information stored within a trusted device. The trusted device includes a buffer to which registers are virtualized to and from external storage, by encrypting the register values using a private device key. The registers may be platform control registers (PCRs) or other storage of the trusted device, which may be a trusted platform module (TPM). The registers are accessed in accordance with a register number. When the externally stored values are retrieved, they are decrypted and placed in the buffer. The buffer may implement a cache mechanism, such as a most recently used algorithm, so that encryption/decryption and fetch overhead is reduced. A register shadowing technique may be employed at boot time, to ensure that the trusted device is not compromised by tampering with the externally stored virtualized registers.

16 Claims, 5 Drawing Sheets

(56) References Cited

U.S. PATENT DOCUMENTS

| | | |
|---|---|---|
| 2005/0235141 A1 | 10/2005 | Ibrahim et al. |
| 2005/0246521 A1 | 11/2005 | Bade et al. |
| 2005/0246525 A1 | 11/2005 | Bade et al. |
| 2005/0246552 A1* | 11/2005 | Bade et al. .................... 713/193 |
| 2006/0020781 A1* | 1/2006 | Scarlata et al. ............... 713/100 |
| 2006/0088167 A1* | 4/2006 | Bade et al. .................... 380/281 |
| 2006/0090070 A1 | 4/2006 | Bade et al. |
| 2006/0212939 A1* | 9/2006 | England et al. ................. 726/22 |
| 2007/0079120 A1* | 4/2007 | Bade et al. .................... 713/166 |
| 2009/0282261 A1* | 11/2009 | Khan et al. .................... 713/189 |

FOREIGN PATENT DOCUMENTS

| | | |
|---|---|---|
| TW | 567702 | 12/2003 |
| TW | 595183 | 6/2004 |

* cited by examiner

TRUSTED DEVICE HAVING VIRTUALIZED REGISTERS

BACKGROUND OF THE INVENTION

1. Technical Field

The present invention relates generally to security in processing systems, and more particularly, to a methodology and apparatus for virtualizing storage in a trusted device.

2. Description of the Related Art

Data and code protection in present day secure computing systems increasingly calls for the integration of trusted computing mechanisms. In particular, in large-scale server systems, data accessible from a platform may include actual storage or pathways to storage that could compromise a very extensive and valuable information. Therefore, the server systems must be secured, so that not only are they protected for external attack via external networks, but the identity of each computing components is ideally assured prior to permitting the components access to the data and prior to execution of any code that requires a trusted platform.

The typical mechanism for implementing a trusted platform is to incorporate trusted devices, referred to as trusted platform modules (TPMs) in standards promulgated by the Trusted Computing Group (TCG), in each removable subsystem. The TPMs are used to verify that the subsystems' identity matches a particular trusted identity, and can also be used to verify that the TPM is installed in the correct subsystem. The uniqueness of a trusted device is assured by a device key that is unique to the particular device. The key is hardwired or installed during manufacture of the device and cannot be read from the device by any interface.

The TPM device key is used to perform various security checks using the trusted device. The trusted device includes processing elements and registers, as well as optional dedicated encryption circuits, so that verification, encryption and decryption performed with the device key are "sealed" to the device. A set of registers in the TPM known as platform control registers (PCRs) store information such as hash values representing software modules executing in the system, additional cryptographic keys and other information that must be securely maintained so that a query of the TPM can be trusted to accurately represent the state of the trusted platform.

However, since the storage in the TPM is sealed, storage space is necessarily limited, since the registers that represent the platform state are contained within the TPM. As applications of TPMs increase to include storage devices and other applications where a large number of registers are needed to describe the secured elements present in the platform, the cost of the TPM increases.

Therefore, it would be desirable to provide a trusted device having extensible registers and a method for securing the register extension, so that storage limitations within the trusted device can be overcome.

SUMMARY OF THE INVENTION

The objective of providing a trusted device having extensible registers is accomplished in a method and apparatus. The apparatus is a trusted device integrated circuit, and portions of the method may be embodied in a computer program product for execution within a processing core within the trusted device.

The trusted device includes a storage buffer and control logic for securely storing and retrieving values to and from the buffer and storage external to the trusted device. A key private to the trusted device is used to symmetrically encrypt and decrypt the values, so that the values are not compromised when transferred outside of the trusted device. A register number is used to index the externally stored values so that an arbitrarily large number of virtual registers can be supported within the trusted device, as specified by the index size and the size of available external storage.

The buffer may implement a cache mechanism according to most recently used or other rules, so that frequently read registers can be retrieved without requiring external fetching and decryption. Register shadowing techniques may be employed at startup to ensure that the integrity of the trusted device is not compromised by tampering with the externally stored and encrypted register values.

The foregoing and other objectives, features, and advantages of the invention will be apparent from the following, more particular description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

DESCRIPTION OF ILLUSTRATIVE EMBODIMENT

The present invention concerns trusted devices, and in particular trusted devices such as trusted platform modules (TPMs), which are generally integrated circuits having platform control registers (PCRs) and other features for securely verifying the identity of a processing node or other computer element and system state such as the software modules being executed by a processing node. The present invention provides a mechanism and methodology by which an arbitrarily extensible set of storage, such as the PCR set and/or other registers within the trusted device, can be provided via a symmetrical encryption/decryption process so that the register values are transferred to and from an external storage device as, needed. It is further contemplated that the techniques of the present invention apply not only to trusted devices, but to any device for which it is useful to import and export registers or other storage securely.

Figure 1:
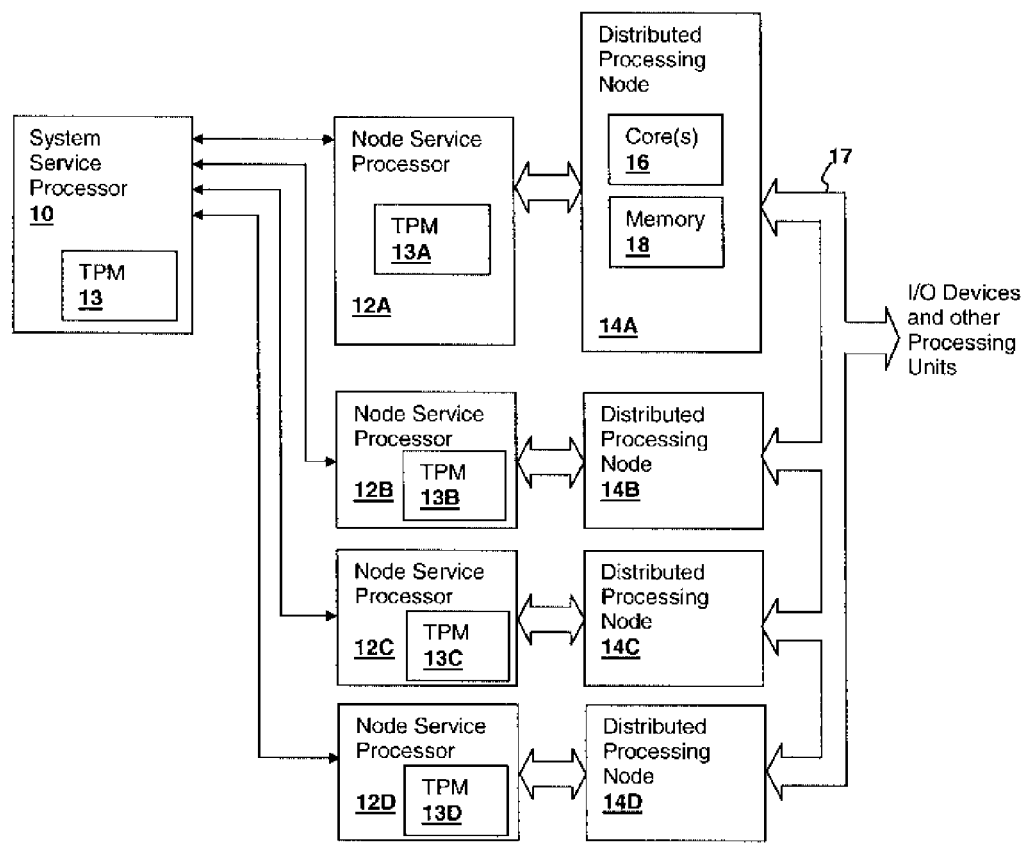
FIG. 1 is a block diagram of a distributed computing system in which an embodiment of the invention is practiced.

With reference now to the figures, and in particular with reference to FIG. 1, there is depicted a block diagram of a distributed processing system in which an embodiment of the present invention is practiced. It should be understood that the depicted embodiment is not intended to be limiting, but only exemplary of the type of processing system to which the methods and techniques of the present invention may be applied. The depicted system includes multiple distributed processing nodes 14A-14D, which may form part of a rack server for executing client web-based processes requiring a high level of security such as financial transaction services, or another distributed computing system in which data must be secured from unauthorized access or tampering. Each distributed processing node 14A-14D is coupled to a corresponding node service processor 12A-12D, which controls startup/shutdown of the corresponding processing node 14A-14D, as well as other services such as fault detection in association with the operation of the corresponding distributed processing node 14A-14D. System control is provided by a system service processor 10, which communicates with each node service processor 14A-14D to assert top-level system control and provide system level status coalescing. System service processor 10 is controlled by a hypervisor that manages the top-level software environment executed by processing nodes 14A-14D, which may include multiple differing operating systems that are virtualized by the hypervisor. Distribute processing nodes 14A-14D are connected by a high-speed bus or network 17 to other distributed processing node groups and I/O devices.

Security within the system depicted in FIG. 1 is provided by a TPM 13 in system service processor 10, which may be integrated within a service processor integrated circuit, or may be a separate integrated circuit mounted in the system service processor 10 subsystem module. Similarly, each node service processor 12A-12D includes a node-level TPM 13A-13D. TPMs 13, 13A-13D each include at least one private device key that is not accessible by devices external to TPMs 13, 13A-13D, and that is used to encrypt and later decrypt information provided by external devices and programs as well as providing digital signatures that uniquely identify the platform modules in which TPMs 13, 13A-13D are installed. PCRs are provided within TPMs 13, 13A-13D and in the present invention, are virtualized, so that an arbitrarily large set of PCRs can be provided without requiring simultaneous storage (e.g., a unique register) for each PCR within TPMs 13, 13A-13D. Although the embodiment of the invention as described herein provides PCRs within TPMs that can be used to satisfy the requirements of the trusted computing group (TCG) specifications, it is contemplated that other types of trusted devices can also be enhanced by the application of the techniques of the present invention to those other types of trusted devices. Further, it is contemplated that the techniques of the present invention apply not only to trusted devices, but to any device for which it is useful to import and export registers or other storage in a secure manner. Therefore, the storage that may be securely virtualized may be registers or other storage other than PCRs within a TPM, but apply in particular to that exemplary combination as described below. Further, while the exemplary embodiment below describes using a single device private key to symmetrically encrypt and decrypt the register values during storage and retrieval to and from storage external devices, it is understood that a dedicated device private key may be provided for the specific purpose of virtualizing registers, and/or multiple device private keys may be employed. For example, a specific device private key may be use for a particular operating system and/or application, and an array of such keys associated with multiple applications and/or operating systems by index. Further, asymmetrical encryption/decryption may also be employed to virtualize registers, with consequent penalties in performance.

Figure 2:
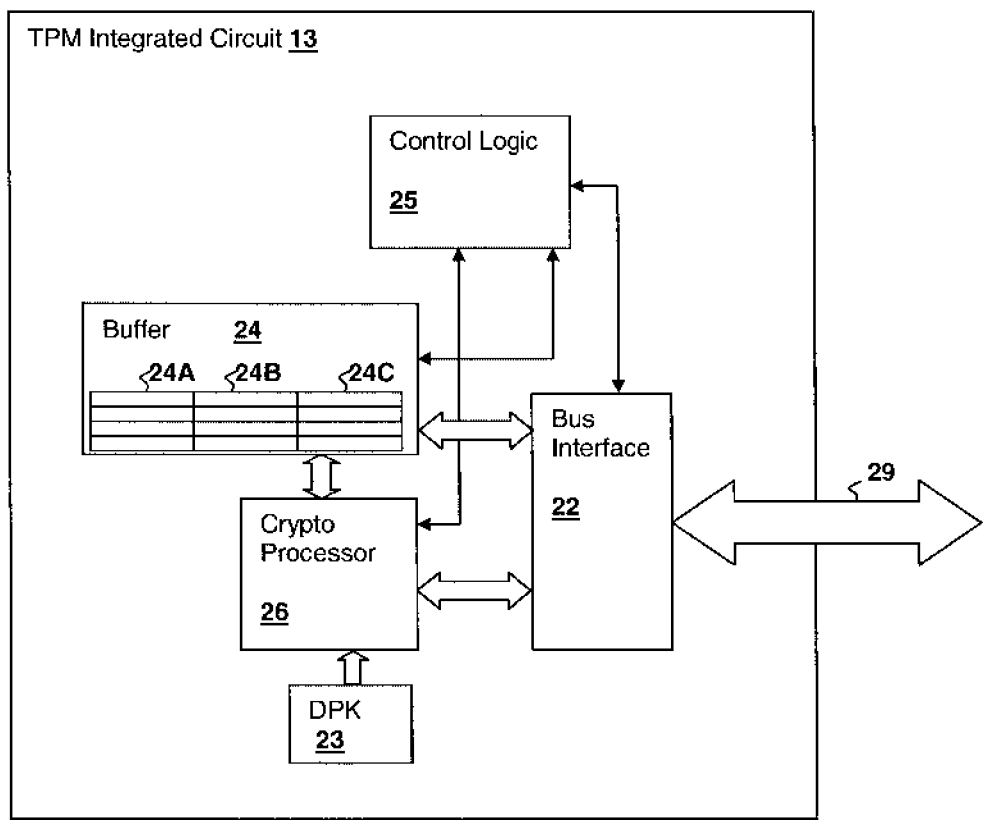
FIG. 2 is a block diagram of a trusted device in accordance with an embodiment of the present invention.

Referring now to FIG. 2 details of TPM 13 are shown and are identical to the internal details of TPMs 13A-13D, as well. An external bus connection 29 is use to communicate via a bus interface circuit 22 with other circuits within TPM 13. A cryptographic processor 26 provides encryption/decryption services according to the different protocols required, and accesses a stored device private key (DPK) 23 to uniquely encrypt data values that can then only be decrypted by TPM 13. The DPK values 23 for each of TPMs 13 and 13A-13D are unique, although the other hardware details of TPMs 13 and 13A-13D are the same. The present invention provides virtualized PCR storage via a control logic 25, which may be a processor core executing firmware internal to TPM 13, and a buffer 24 that provides temporary storage for one or more PCRs. In the depicted embodiment, each register storage location in buffer 24 includes a tag field 24A, a value field 24B and a caching control field 24C. Value field 24B holds the actual PCR value that can be read from and written to by bus interface 22 in response to a PCR retrieve or store request. However, buffer 24 does not include storage for all of the PCRs accessible via bus interface, but only a cached portion of the total PCR storage. Tag field 24A is sized to provide a range of register numbers so that the maximum number of PCRs that would be required for a TPM can be represented.

Tag field 24A is used to identify the PCRs that are presently cached in buffer 24 and contain the PCR register number of the corresponding value contained in value field 24B. When a request is made to read or write a particular PCR, control logic 25 checks the tag fields 24A of each of the locations within buffer 24 and if the requested PCR is not present, it is loaded into a free location within buffer 24. The loading is performed by retrieving an encrypted buffer value from external storage via bus interface 22 and decrypting that buffer value using DPK 23 and cryptographic processor 26. If a free location is not available within buffer 24, then a cache algorithm such as least-recently-used (LRU) cast-out is employed. While the embodiment described herein operates on single cache values as needed, it is understood that buffer 24 may operate as or include a prefetch buffer and that multiple virtual register value may be retrieved in response to a single request, for example a neighborhood or bank of virtualized registers may be loaded simultaneously in expectation that other registers in the neighborhood or bank will also likely be accessed. Control logic 25 scans the MRU field 24C to determine the least recently used location in buffer 24 and flushes that value to external storage by encrypting the value using cryptographic processor 26 and DPK 23 and storing the value in external storage via bus interface 22. When a register write request is received for a register that is not present in buffer, a similar cast-out load operation can be performed, or the value may be encrypted and written directly to external storage, depending on whether or not the particular algorithm implemented by control logic 25 treats register writes as a "register use" event for the purposes of determining which register values should be cached in buffer 24. Also, write caching may or may not be employed in that if buffer 24 is written, external storage of virtual registers may or may not be updated and/or invalidated until such time as the written value is flushed. It is contemplated that a variety of caching algorithms may be employed, such as measuring register access frequency via access counts rather than using a simpler MRU/LRU scheme.

Although the circuit shown in FIG. 2 uses the main TPM bus interface 22 to store the encrypted virtualized PCR registers, so that system memory can be used for storage, it is contemplated that a dedicated and separate bus may be alternatively employed. For example, a dedicated interface to an external FLASH memory could be implemented so that the virtualized encrypted register information is inaccessible to other devices in the system. Such an implementation could provide a low-cost TPM 13 through reduced on-chip storage and universality of the design, while providing a flexible solution to the system integrator, who can choose the external memory size. In general, due to the secure nature of the virtualization of the present invention, and the generally large size and ready availability of system memory, the depicted embodiment provides a universal and low-cost solution for providing a large set of virtualized PCRs.

To secure the PCR virtualization during re-boot, a complete set of shadow registers may be employed. The shadow registers can be completely virtualized and represent an identical image of the PCRs as encrypted. When the platform or particular module associated with TPM 13 is rebooted, the regular PCR storage is reset, but the virtualized shadow register values are retained. The shadow PCRs can then be compared with the actual PCRs after reboot and if a mismatch occurs, an appropriate security action can be taken. Once a trusted reboot has occurred, the shadow PCRs can then be reset to match the actual PCRs.

Figure 3:
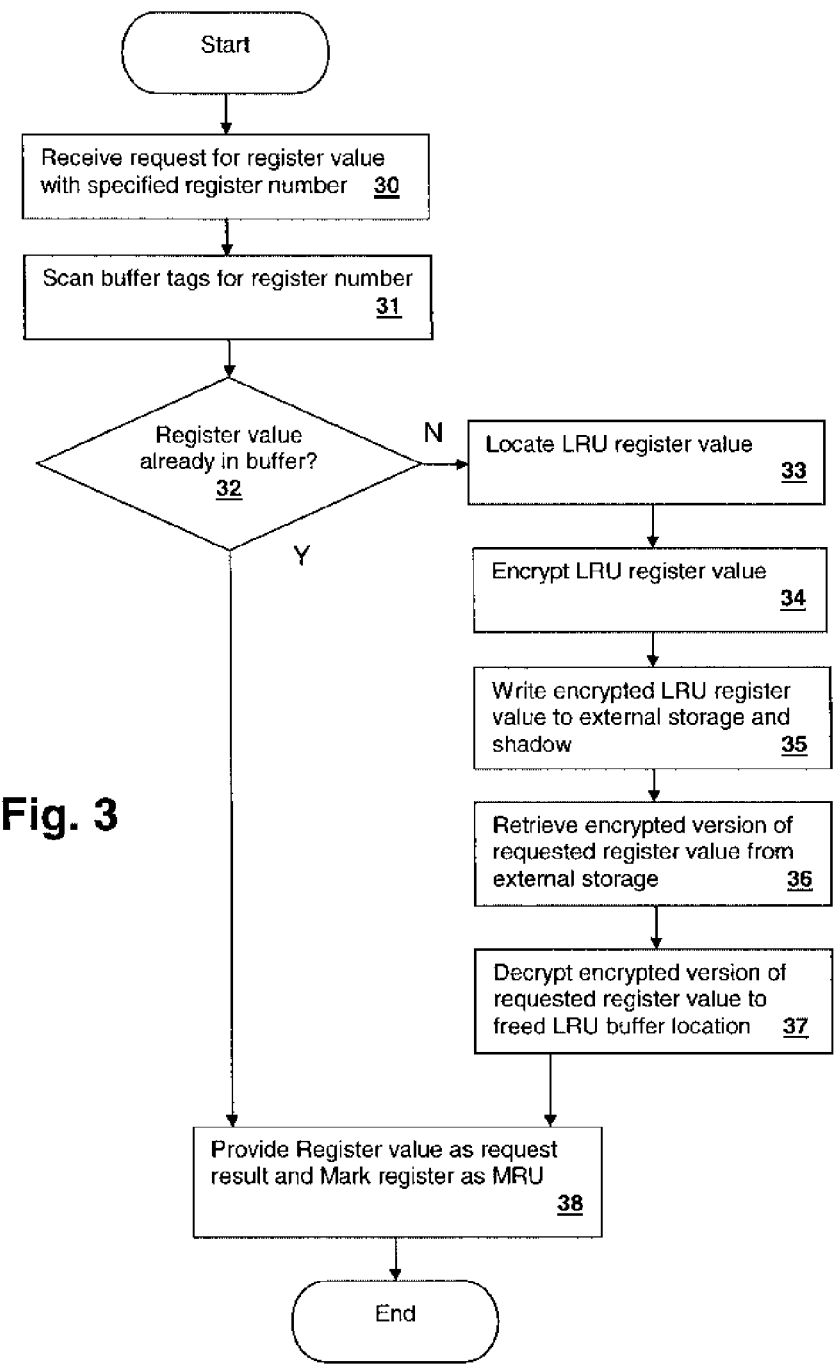
FIG. 3 is a flowchart depicting a virtual register read method in accordance with an embodiment of the present invention.

Referring now to FIG. 3, a PCR read method in accordance with an embodiment of the present invention is illustrated in a flowchart. It is understood that a variety of algorithms may be employed to implement the present invention, and thus the illustrated method is only one example of a method that can be used to carry out the invention. When a request for a register value from a specified register number (location) is received (step 30), buffer 24 tag values 24A are scanned for the register number (step 31). If the register value is already in the buffer (decision 32), then the value is provided as the request result, and that register is marked as MRU (step 38). If the register value is not present in buffer (decision 32), then the LRU register value is located (step 33), encrypted (step 34) and written to external normal register and shadow register storage (step 35). The encrypted version of the requested register value is retrieved (step 36) and decrypted to buffer 24 (step 37) and is then provided as the request result and the storage location in buffer 24 for that value is marked as MRU (step 38).

Figure 4:
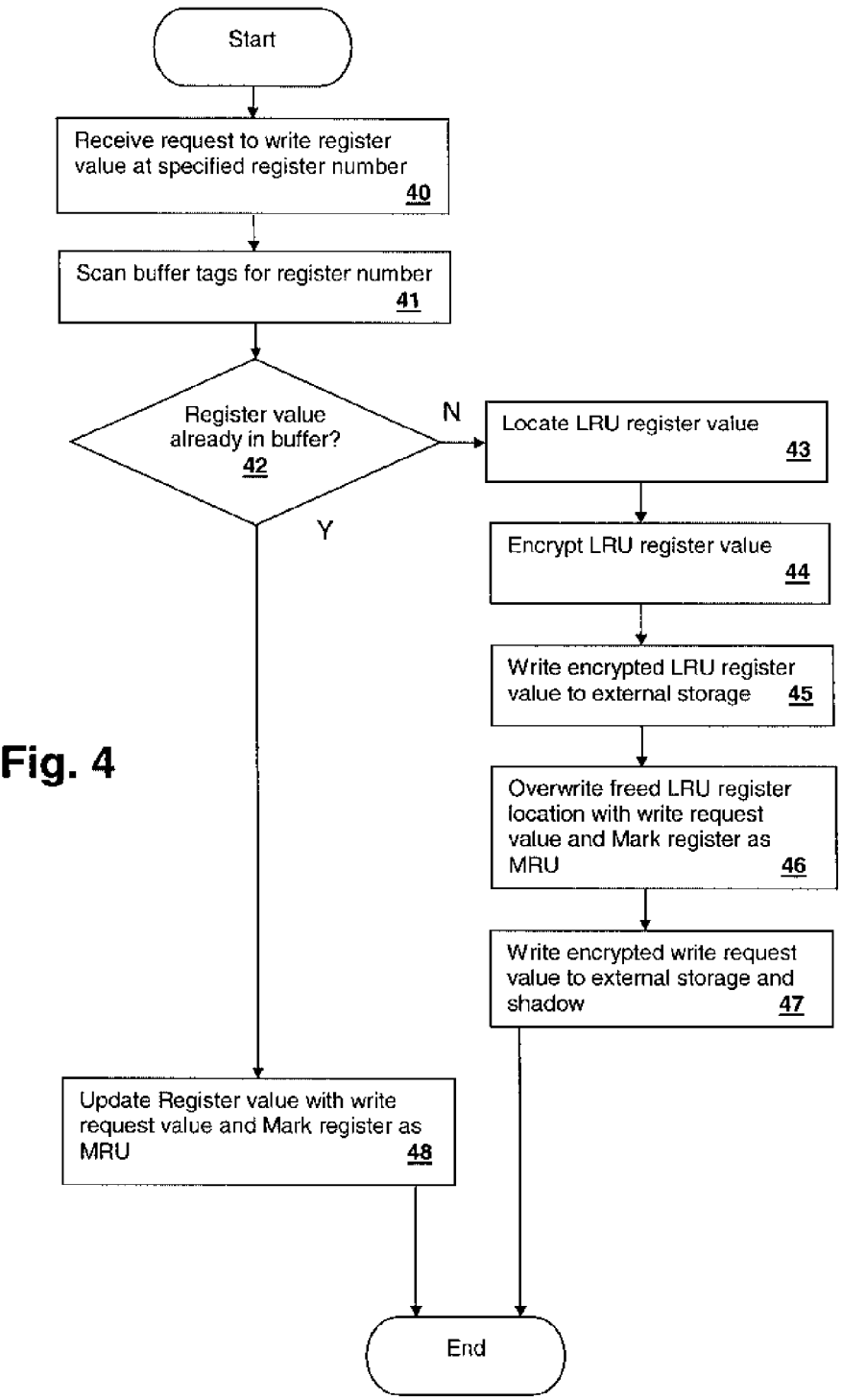
FIG. 4 is a flowchart depicting a virtual register write method in accordance with an embodiment of the present invention.

Referring now to FIG. 4, a PCR write method in accordance with an embodiment of the present invention is illustrated in a flowchart. It is understood that a variety of algorithms may be employed to implement the present invention, and thus the illustrated method is only one example of a method that can be used to carry out the invention. When a request to write a register value to a specified register number (location) is received (step 40), buffer 24 tag values 24A are scanned for the register number (step 41). If the register value is already in the buffer (decision 42), then the value is updated, and that register is marked as MRU (step 48). If the register value is not present in buffer (decision 42), then the LRU register value is located (step 43), encrypted (step 44) and written to external normal register and shadow register storage (step 45). The freed LRU register location is then overwritten the register value supplied by the write request and the location is marked as MRU (step 46). The supplied value is also encrypted and written to external PCR normal and shadow register storage (step 47).

While the above-described embodiment provides a complete hardware-based solution for providing a TPM with an large set of PCRs through register virtualization, another implementation is contemplated, according to an alternative embodiment of the invention, that provides not only an arbitrarily large set of PCRs, but can leverage existing hardware and services to provide for virtualizing PCRs. In the alternative embodiment, a device driver that manages TPM requests, is modified to virtualize register storage by requesting TPM to encrypt and decrypt the register values passed to the device driver by requesters. As such, an existing TPM having a limited number of PCRs can either be extended, or the PCRs within the TPM can be ignored and the device driver then uses the TPM to provide encryption and decryption services on the virtualized register values.

Figure 5:
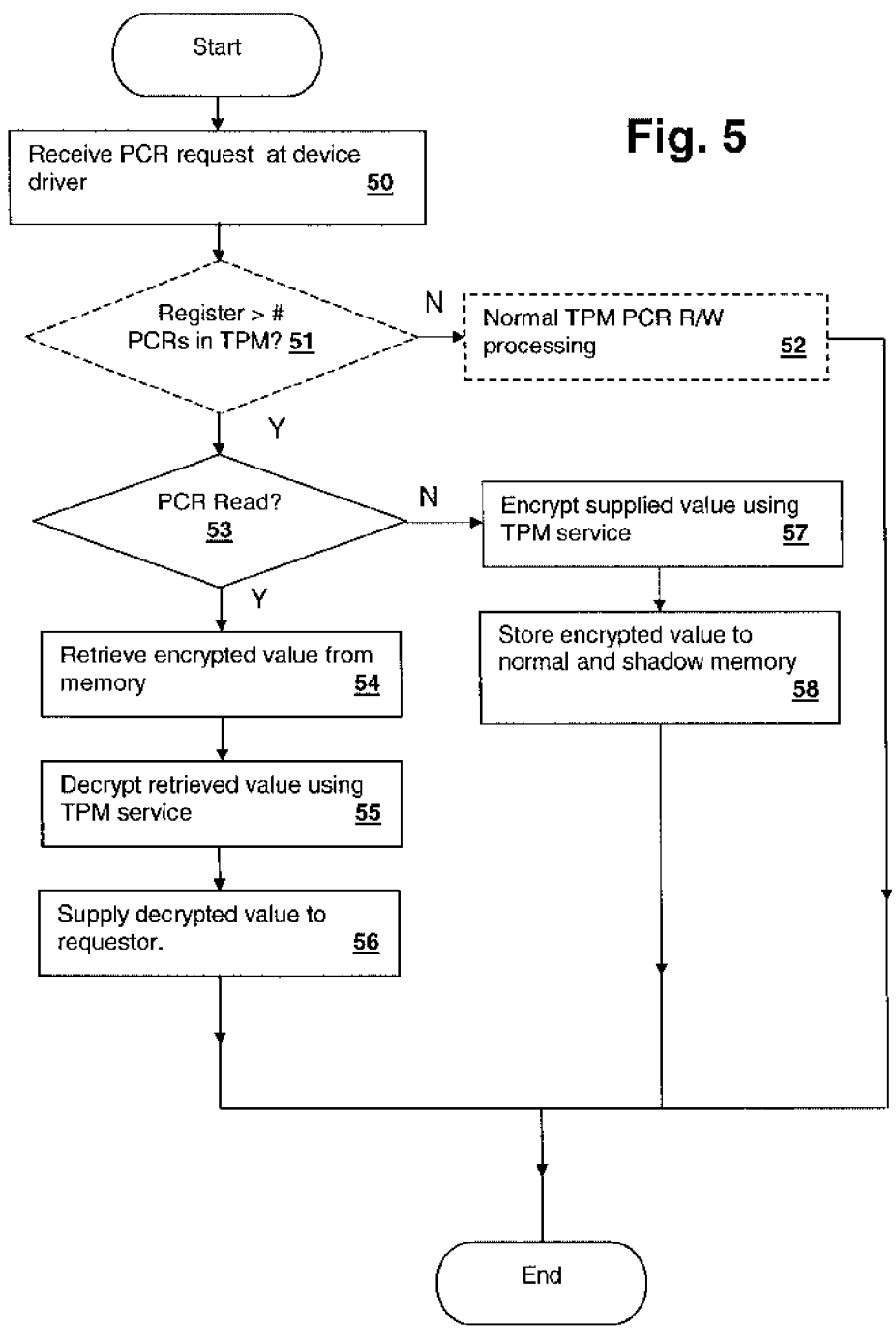
FIG. 5 is a flowchart depicting a virtual register method in accordance with another embodiment of the present invention.

Referring now to FIG. 5, operation of such a device driver is illustrated. When the device driver receives a request associated with a virtualized PCR register value (step 50). If the fixed number of PCRs of the TPM is optionally used, the register number can be compared with the number of PCRs supported by the TPM (decision 51) and the request processed in the normal manner (TPM PCR read/write) for the supplied request (step 52). For virtualized registers, if the request is a read request (decision 53), the device driver retrieves the virtualized PCR encrypted value from memory (step 54) and supplies the encrypted value to the TPM for decryption (step 55). The decrypted result is then supplied to the requester (step 56). If the request is a write request (decision 53), the device driver supplies the register value to the TPM for encryption (step 57) and stores the encrypted result in the normal and shadow virtualized storage locations (step 58). It is understood that combinations of the device driver technique with the hardware techniques described above may be made. For example, one embodiment may include a TPM having cache-based PCR storage, but managed by a device driver that retrieves and decrypts virtualized PCRs only in response to the TPM indicating that the PCR value is absent from buffer 24.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method for virtualizing storage within a trusted device integrated circuit in a secured processing system, method comprising:

receiving a request for a first data register value associated with a register number uniquely specifying either a physical data register within the trusted device integrated circuit or a virtual data register of the trusted device integrated circuit;

determining whether the register number specifies an unencrypted physical register of the trusted device integrated circuit or a virtual register for which an encrypted value is stored in a storage external to the trusted device integrated circuit, by comparing the register number supplied with the request with a predetermined value;

responsive to the receiving and in response to determining that the register number specifies an unencrypted physical register of the trusted device integrated circuit, first responding to the request by providing the first data register value from the physical register specified by the register number;

responsive to the receiving and in response to determining that the register number specifies a virtual register, retrieving the encrypted version of the first data register value from the storage external to the trusted device integrated circuit using the register number;

responsive to retrieving the encrypted version of the first data register value, decrypting the retrieved encrypted version of the first data register value using a private device key to obtain the first data register value and storing the first data register value in a buffer in the trusted device integrated circuit; and second responding to the request by providing the first data register value from the buffer.

2. The method of claim 1, further comprising:

encrypting a second data register value stored in the buffer; and storing a result of the encrypting external to the trusted device integrated circuit, in the storage, whereby a result of the encrypting can be later retrieved.

3. The method of claim 2, wherein the receiving, the retrieving, the second responding and the storing are performed by a device driver executing within secured processing system and wherein decrypting and encrypting are performed by the trusted device in response to requests made by the device driver to the trusted device.

4. The method of claim 2, further comprising:

storing result of the encryption to a shadow register accessible according to register number; and comparing stored result of the encryption during a subsequent boot process with a shadow value stored in the shadow register.

5. The method of claim 2, wherein the encrypting and the storing are performed in response to the receiving, whereby second data register value is flushed to the external storage to make the buffer available for storing the first value.

6. The method of claim 5, wherein the buffer includes multiple storage locations, and further comprising selecting one of the storage locations according to a cache algorithm, and wherein the encrypting and storing are performed on selected storage location, and wherein the decrypting decrypts the retrieved encrypted version of the first value to the selected storage location.

7. The method of claim 1, wherein the request specifies the register number from a range of virtual registers at least an order of magnitude larger than a number of physical registers that are internal to the trusted device.

8. The method of claim 1, wherein each location in the buffer includes a value register for storing the value and a tag register for storing the register number, and wherein the decrypting decrypts the retrieved encrypted version of the first value to the value register and wherein the method further comprises writing the register number to the tag register.

9. The method of claim 1, wherein the receiving, retrieving and second responding are performed by a device driver executing within the secured processing system and wherein the decrypting is performed by said trusted device in response to a request by the device driver to the trusted device.

10. A trusted device integrated circuit, comprising:

a plurality of physical registers;

a buffer for storing values of virtual data registers of the trusted device;

a cryptographic processing circuit for symmetrically encrypting and decrypting the values of the data registers; and a control logic for receiving a request to access a register according to a register number supplied with the request that uniquely specifies either an unencrypted physical data register within the trusted device integrated circuit or a virtual data register of the trusted device integrated circuit for which an encrypted data register value is stored in a storage external to the trusted device integrated circuit, wherein the control logic determines whether the register number specifies an unencrypted physical register of the trusted device integrated circuit or a virtual register for which an encrypted data register value is stored external to the trusted device integrated circuit, by comparing the register number supplied with the request with a predetermined value, wherein the control logic, in response to determining that the register number specifies an unencrypted physical register within the trusted device integrated circuit, responds to the request by providing the first data register value from the physical register specified by the register number, and wherein the control logic, in response to determining that the register number specifies a virtual register of the trusted device integrated circuit, retrieves an encrypted version of the first data register value from a storage external to the trusted device integrated circuit and causes the cryptographic processor to decrypt the encrypted version of the first data register and store a result of the decryption in the buffer, and provides a response to the request from the buffer.

11. The trusted device integrated circuit of claim 10, wherein the control logic receives a write request to write a supplied value according to register number, wherein the control logic causes the cryptographic processor to encrypt the supplied value to provide the encrypted data register value and stores the encrypted data register value in the external storage.

12. The trusted device integrated circuit of claim 10, wherein buffer comprises a plurality of storage registers, wherein each of the registers stores a tag value and a corresponding one of the values of the platform control registers, wherein control logic identifies a location of a particular register corresponding to the register number using the tag value.

13. The trusted device integrated circuit of claim 12, wherein each of the the data registers further stores an indication of frequency of access to the each data register.

14. The trusted device integrated circuit of claim 10, wherein in response to a read request, control logic determines whether or not a free location is present in the buffer and if a free location is not present, the control logic causes a write of one of values stored in the buffer to external storage.

15. The trusted device integrated circuit of claim 10, wherein the control logic further maintains a set of virtual shadow registers in the external storage that are modified in conformity with modification of the data register values performed in response to the request.

16. A trusted device integrated circuit, comprising:

a plurality of physical registers;

a buffer for storing values of virtual data registers of the trusted device;

a cryptographic processing circuit for symmetrically encrypting and decrypting the values of the data registers; and a control logic for receiving a request to access a register according to a register number supplied with the request that uniquely specifies either an unencrypted physical data register within the trusted device integrated circuit or virtual data register of the trusted device integrated circuit for which an encrypted data register value is stored in a storage external to the trusted device integrated circuit, wherein the control logic determines whether the register number specifies an unencrypted physical register of the trusted device integrated circuit or a virtual register for which an encrypted data register value is stored external to the trusted device integrated circuit by comparing the register number supplied with the request with a predetermined value, wherein the control logic, in response to determining that the register number specifies an unencrypted physical register within the trusted device integrated circuit, responds to the request by directly accessing the unencrypted physical data register specified by the register number, and wherein the control logic, in response to determining that the register number specifies a virtual register of the trusted device integrated circuit, determines whether the request is a read request and responsive to determining that the request is a read request, retrieves the encrypted version of the data register value from a storage external to the trusted device integrated circuit and causes the cryptographic processor to decrypt the encrypted version of the data register value and store a result of the decryption in the buffer, and provides a response to the request from the buffer, and wherein the control logic, responsive to determining that the request is a write request, causes the cryptographic processor to encrypt a write value supplied with the request and store a result of the encryption in the storage external to the trusted device integrated circuit.

* * * * *